(12) United States Patent
Jeong

(10) Patent No.: US 7,889,606 B2
(45) Date of Patent: Feb. 15, 2011

(54) OPTICAL DISC DRIVE AND CONTROL METHOD THEREOF

(75) Inventor: Kab Kyun Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 715 days.

(21) Appl. No.: 11/746,113

(22) Filed: May 9, 2007

(65) Prior Publication Data

US 2008/0025161 A1 Jan. 31, 2008

(30) Foreign Application Priority Data

Jul. 25, 2006 (KR) .................. 10-2006-0070021

(51) Int. Cl.
*G11B 7/00* (2006.01)
(52) U.S. Cl. .................. 369/44.29; 44/44.28; 44/53.28
(58) Field of Classification Search ............. 369/44.11, 369/44.28, 44.29, 53.28
See application file for complete search history.

(56) References Cited

U.S. PATENT DOCUMENTS

| | | | |
|---|---|---|---|
| 5,852,592 A | 12/1998 | Braat | |
| 6,674,696 B1 * | 1/2004 | Ichimura et al. | 369/44.35 |
| 7,260,032 B2 * | 8/2007 | Tadano | 369/44.29 |
| 7,502,286 B2 * | 3/2009 | Hayashi et al. | 369/44.32 |
| 2003/0210621 A1 * | 11/2003 | Hayashi | 369/44.34 |
| 2007/0091738 A1 * | 4/2007 | Liu et al. | 369/44.11 |
| 2007/0286033 A1 * | 12/2007 | Urakawa et al. | 369/30.1 |
| 2007/0286038 A1 * | 12/2007 | Yoshimoto et al. | 369/44.29 |
| 2009/0067307 A1 * | 3/2009 | Yanagawa et al. | 369/53.23 |

* cited by examiner

*Primary Examiner*—Wayne R Young
*Assistant Examiner*—Brenda Bernardi
(74) *Attorney, Agent, or Firm*—Stanzione & Kim LLP

(57) ABSTRACT

An optical disc drive and a control method thereof are disclosed to prevent unstable servo-control of a pickup module caused by an abnormal control signal, when recording/reproducing/erasing of information on/from an optical disc in the optical disc drive, and in particularly, possible collision between the pickup module and the optical disc, even when the pickup module very closely approaches the surface of the optical disc during recording/reproducing/erasing of information on/from a high density optical disc. The optical disc drive includes a pickup module having an objective lens focusing a laser on the surface of a recording layer of the optical disc, and a servo-controlling unit performing the focus servo-control of the pickup module using a high frequency broadband control and a low frequency broadband control of a focus error signal where the high frequency broadband control is performed prior to the frequency broadband control.

22 Claims, 8 Drawing Sheets

OPTICAL DISC DRIVE AND CONTROL METHOD THEREOF

CROSS-REFERENCE TO RELATED APPLICATIONS

This application claims all benefits accruing under 35 U.S.C. §119 from Korean Patent Application No. 2006-70021, filed on Jul. 25, 2006, in the Korean Intellectual Property Office, the disclosure of which is incorporated herein by reference.

BACKGROUND OF THE INVENTION

1. Field of the Invention

The present invention relates to an optical disc drive and a control method thereof, and more particularly, to an optical disc drive for stably driving many kinds of high density optical discs and a control method thereof.

2. Related Art

An optical disc drive is a device for projecting a laser beam on a spiral track formed on a recording layer surface of an optical disc to record and reproduce information. The recording of information is performed by generating a pit in the recording track, and the reproduction of information is performed by projecting a laser beam on the track formed with the pits and analyzing variation of the quantity of the laser beam reflected from the recording pits.

The laser beam projected from a light source, such as semiconductor laser diode (LD), is focused on the recording track by the operation of optical components, such as an objective lens, a prism, and the like to generate a light spot of a diameter less than few μm. In order to record and reproduce information of the optical disc, the light spot must be continuously formed on the very narrow track.

However, since the optical disc has a bending of about 200 μm on the recording layer surface and about 50 μm track deflection, the track moves with a large amplitude as the optical disc rotates. Due to these reasons, in order to focus the light spot on a target track and to track the recording track, the objective lens must be controlled using two servo-controls such as a focus servo-control and a tracking servo-control.

The focus servo-control is to control the objective lens to move in the normal direction with respect to the surface of the optical disc such that a light spot having a predetermined size is formed on the track of the optical disc so that the size of the light spot is controlled. In contrast, the tracking servo-control is to control the objective lens to move in the radial direction of the optical disc such that the light spot is formed along the center of the track so that the position of the light spot is controlled.

Optical components within the optical disc drive used to control the objective lens are typically part of an optical pickup or a pickup module. Such an optical pickup or pickup module contains two actuators for driving the objective lens, a sensor for detecting the position of the light spot, and a carriage for housing the optical components, and a linear actuator for driving the carriage in the radial direction of the optical disc. Also included in the optical disc drive are a digital signal processor, a servo-controller, and a motor.

A blue-ray disc (hereinafter referred to a 'BD') as a high density optical disc has a numerical aperture of 0.85 which is relatively higher than those of an HD DVD, a DVD, and a CD. Thus, since the pickup module of the optical disc drive approaches more closely the surface of the BD for the recording/reproducing/erasing of information in comparison to a case of other optical discs, a stable control is required to prevent the objective lens of the pickup module colliding against the surface of the BD.

For example, when a kind of an optical disc in which information is recorded/reproduced/erased is wrongly determined by the optical disc drive, the information is recorded/reproduced/erased by an unexpected recording/reproducing strategy instead of a recording/reproducing strategy adequate for a corresponding optical disc. Due to this common occurrence, the possibility of generating an abnormal control signal different from a normal control signal (a tracking error signal or a focus error signal) generated when using the adequate recording/reproducing/erasing strategy is very high. Therefore, the control of the pickup module by the abnormal tracking error signal or the focus error signal cannot be reliable. Accordingly, this problem must be addressed and prevented in view of collision between the pickup module and the optical disc.

SUMMARY OF THE INVENTION

Several aspects and example embodiments of the present invention provide an optical disc drive in which unstable servo-control of a pickup module caused by an abnormal control signal is prevented when recording/reproducing/erasing information on an optical disc in the optical disc drive, and a control method thereof.

Additional aspects of the present invention provide an optical disc drive in which a pickup module is prevented from colliding against an optical disc by a stable servo-control even when an objective lens of the pickup module approaches very closely to the surface of the optical disc to record/reproduce/erase information, and a control method thereof.

In accordance with an example embodiment of the present invention, there is provided an optical disc drive including: a pickup module comprising an objective lens to focus a laser beam on a surface of a recording layer of an optical disc; and a servo-controlling unit to perform a focus servo-control of the pickup module using a high frequency broadband control and a low frequency broadband control of a focus error signal where the high frequency broadband control is performed prior to the low frequency broadband control.

According to an aspect of the present invention, the optical disc drive further includes an RF amplifier to receive a RF signal from the pickup module and to generate the focus error signal, a first control signal, and a second control signal, wherein the servo-controlling unit generates a focus driving signal for a focus servo-control of the pickup module using the focus error signal, the first control signal, and the second control signal.

According to an aspect of the present invention, the servo-controlling unit includes a focus servo-controller for the focus servo-control of the pickup module, and a tracking servo-controller for a tracking servo-control of the pickup module.

According to an aspect of the present invention, the focus servo-controller includes a high frequency broadband controller for performing the high frequency broadband control of the focus error signal to generate a high frequency broadband control signal, and a low frequency broadband controller for performing the low frequency broadband control to generate a low frequency broadband control signal.

According to another aspect of the present invention, the focus servo-controller further includes an adder to add the high frequency broadband control and the low frequency broadband control signal and to output added signals as the focus driving signal.

According to another aspect of the present invention, the focus servo-controller further includes a first switch for controlling a signal path of the high frequency broadband controller, and a second switch for controlling a signal path of the low frequency broadband controller, wherein the first switch is switched by the first control signal and the second switch is switched by the second control signal.

According to an aspect of the present invention, the high frequency broadband control is to control the objective lens to track the surface of the recording layer of the optical disc, and the low frequency broadband control is to control the objective lens to travel in the optical axis of the laser beam.

In accordance with another example embodiment of the present invention, there is provided a control method of an optical disc drive of performing a focus servo-control of a pickup module using the pickup module having an objective lens for focusing a laser on a surface of a recording layer of an optical disc, a high frequency broadband control and a low frequency broadband control of a focus error signal. Such a control method comprises: performing the high frequency broadband control of the focus error signal to determine if the pickup module stably tracks the surface of a recording layer of the optical disc; and performing the low frequency broadband control of the focus error to compensate for any direct current (DC) offset in the focus error signal, when the high frequency broadband control is stable during the performance of the high frequency broadband control.

According to an aspect of the present invention, the high frequency broadband control is to control the objective lens to track the surface of the recording layer of the optical disc, and the low frequency broadband control is to control the objective lens to travel in an optical axis of the laser beam.

According to an aspect of the present invention, the control method further includes completing the focus servo-control by determining that a focusing has failed when the laser beam is not focused at a target degree while the objective lens tracks the surface of the recording layer of the optical disc through the high frequency broadband control.

In accordance with another example embodiment of the present invention, an optical disc drive is provided with a pickup module including an objective lens to focus a laser light on a surface of a recording layer of an optical disc; and a servo-control unit arranged to generate a focus driving signal to drive the objective lens included in the pickup module to focus the laser light on a target track of the optical disc, based on a focus error signal obtained from a signal corresponding to a quantity of the laser light reflected from the surface of the optical disc, wherein alternating current (AC) components and direct current (DC) components of the focus error signal are controlled such that the objective lens can track the surface of the recording layer of the optical disc and travel in an optical axis of the laser light.

According to an aspect of the present invention, the optical disc drive is further provided with an RF amplifier to receive the signal corresponding to a quantity of the laser light reflected from the surface of the optical disc from the pickup module and to generate the focus error signal, wherein the servo-control unit generates the focus driving signal based on the focus error signal.

According to another aspect of the present invention, the servo-control unit comprises a focus servo-controller arranged to perform a focus servo-control of the pickup module; and a tracking servo-controller arranged to perform a tracking servo-control of the pickup module. The focus servo-controller comprises a high frequency broadband controller arranged to control the alternating current (AC) components of the focus error signal to generate a high frequency broadband control signal; a low frequency broadband controller arranged to control the direct current (DC) components of the focus error signal to generate a low frequency broadband control signal; and an adder to combine the high frequency broadband control and the low frequency broadband control signal and to output added signals as the focus driving signal. Such a focus servo-controller further comprises a first switch for controlling a signal path of the high frequency broadband controller; and a second switch for controlling a signal path of the low frequency broadband controller, wherein the first switch is switched by a first control signal generated from the RF amplifier, and wherein the second switch is switched by a second control signal generated from the RF amplifier.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EXAMPLE EMBODIMENTS

Figure 1:
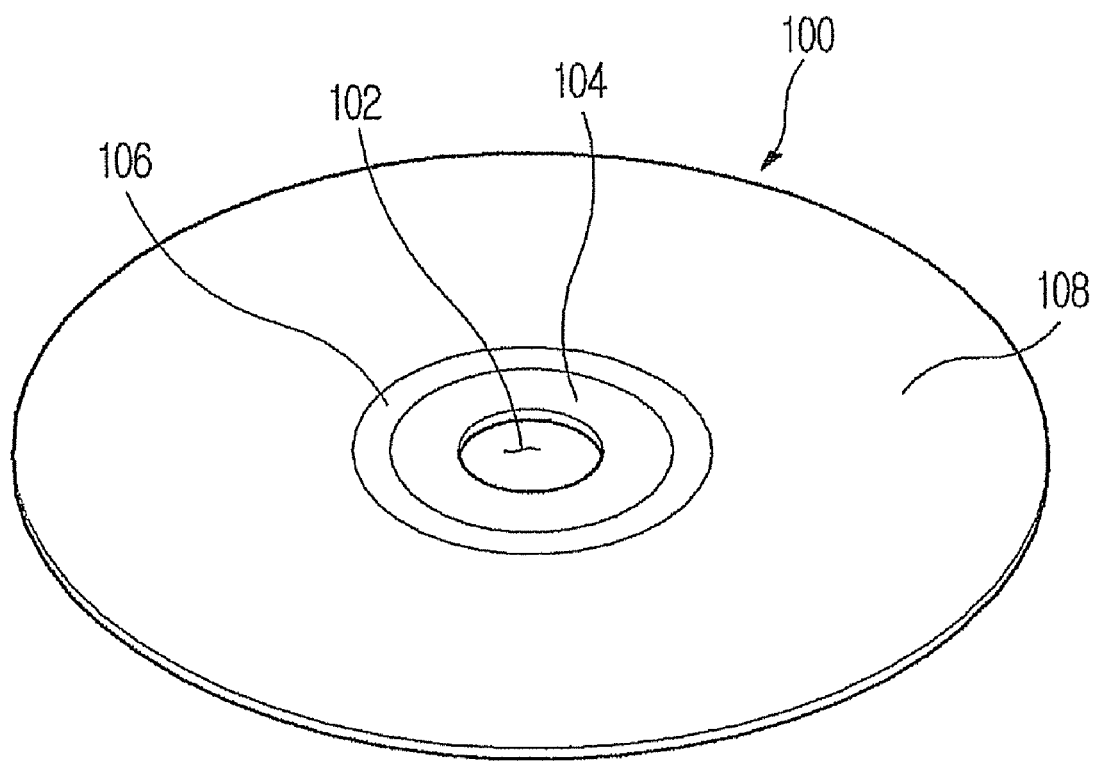
FIG. 1 is a view illustrating an external appearance of an optical disc employed in an example embodiment of the present invention.

Reference will now be made in detail to the present embodiments of the present invention, examples of which are illustrated in the accompanying drawings, wherein like reference numerals refer to the like elements throughout. The example embodiments are described below in order to explain the present invention by referring to FIGS. 1 to 8.

FIG. 1 is a view illustrating an external appearance of an optical disc employed in an embodiment of the present invention. For purposes of brevity, the optical disc drive can be internal (housed within a host) or external (housed in a separate box that connects to a host). An optical disc can be a blu-ray disc (BD) or any high-density medium, such as advanced optical disc (AOD); however, other optical discs can also be utilized, including DVD, DVD-R, DVD-RW, DVD+RW, DVD-RAM, DVD-ROM, CD, CD-R, CD-RW, and CD-ROM.

As shown in FIG. 1, a multi-layer optical disc 100 having plural layers on which information is recorded has a clamping hole 102 into which a rotation shaft is inserted to rotate the optical disc 100. Around the clamping hole 102, a clamping portion is provided to secure the optical disc 100. Around the clamping portion 104, a power calibration area (PCA) 106 and an information area 108 are sequentially formed from an inner periphery to an outer periphery in the radial direction of the optical disc 100.

The PCA 106 represents a test area to optimize a power of a laser beam projected on the recording surface of the optical disc 100 during the recording/reproducing/erasing of the information. Generally, the PCA 106 is reduced whenever power calibration is performed and the number of calibrations is recorded as a count.

The information area 108 represents an area on which information to be substantially stored is recorded, and is provided with a lead-in area, a user data area, and a lead-out area, which are sequentially formed. When a recording apparatus capable of performing a multi-session function and an optical disc are used, a number of a group of "lead-in area-user-data area-lead-out area" proportional to the number of the multi-session exists in the information area 108.

Figure 2:
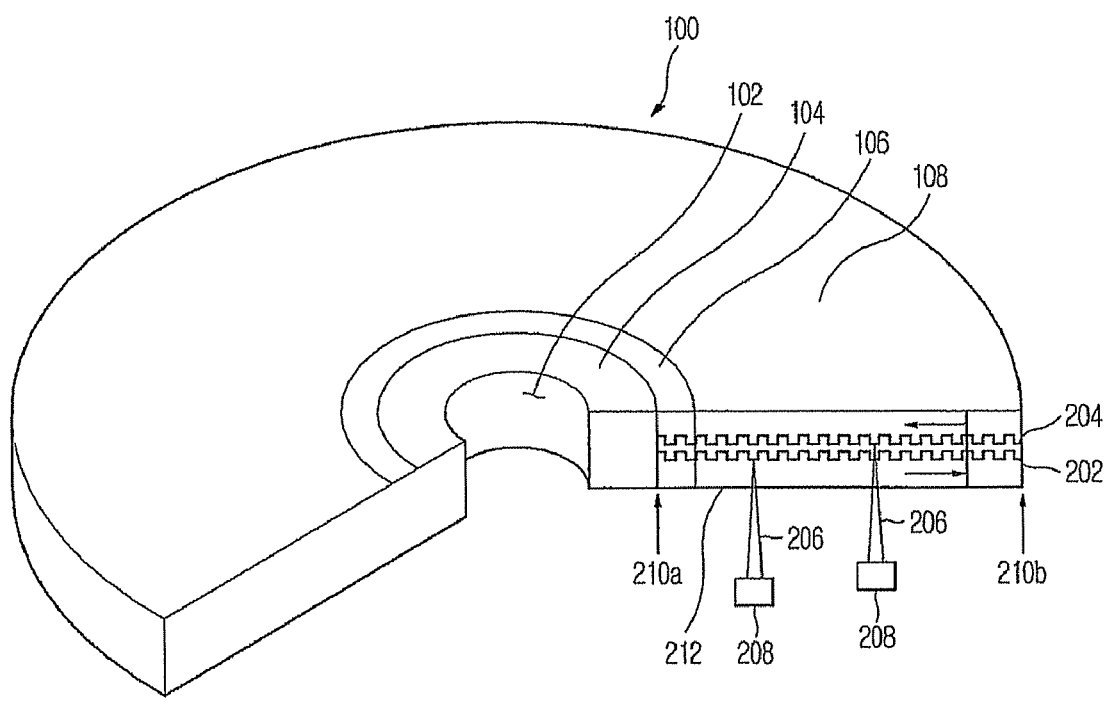
FIG. 2 is a sectional view of the optical disc shown in FIG. 1.

FIG. 2 is a sectional view of the optical disc shown in FIG. 1. The optical disc 100 employed in this example embodiment of the present invention has multiple recording layers on which information is recorded. In a case of a dual layer optical disc having two layers 202 and 204, as shown in FIG. 2, a recording layer located at a lower side is indicated as a recording layer "0" (zero) and a recording layer located at an upper side is indicated as a recording layer "1". On a surface of the recording layer "0" 202 located at the lower side, a protective layer is formed to protect the recording layer "0" 202 from external shock and the surface of the protective layer directly becomes the surface 212 of the optical disc 100.

In the respective two recording layers 202 and 204 of the optical disc 100, spiral continuous tracks on which information is recorded are formed, and a pickup module 208, as shown in FIG. 2, travels from an inner circumference 210a of the optical disc 100 to an outer circumference 210b thereof, and vice versa, and projects a laser beam 206 on a target track of a recording layer for the recording/reproducing/erasing of information.

Figure 3:
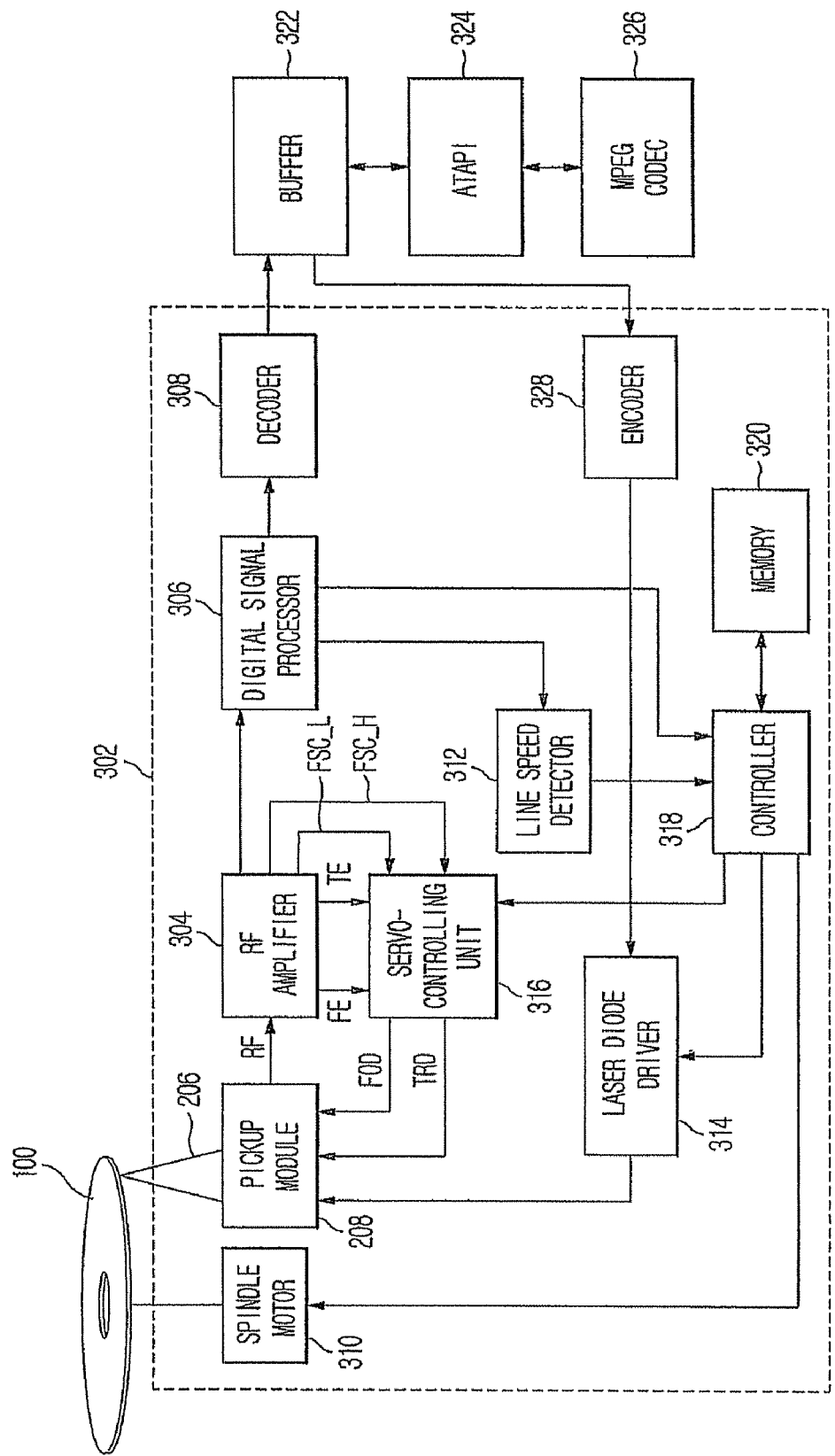
FIG. 3 is a block diagram illustrating an optical disc drive according to an example embodiment of the present invention.

FIG. 3 is a block diagram illustrating an optical disc drive according to an example embodiment of the present invention. A block indicated by a reference numeral 302 shown in FIG. 3 is an optical disc drive according to an example embodiment of the present invention. In addition, a buffer 322, an advanced technology attachment packet (ATAPI) 324 and an MPEG CODEC 326 are components of another device, such as a DVD player or a host computer connected to the optical disc drive 302. However, if necessary, the buffer 322, the ATAPI 324, and the MPEG CODEC 326 may be integrated into the optical disc drive 302. The ATAPI 324 is one of typical data communication interfaces used in communication between an optical disc drive and a CODEC chip.

As shown in FIG. 3, the optical disc drive 302 comprises the pickup module 208, as shown in FIG. 2, a RF amplifier 304, a digital signal processor 306, a decoder 308, a spindle motor 310, a line speed detector 312, a laser diode driver 314 for driving a light source, such as a laser diode (not shown) included in the pickup module 208, a servo controlling unit 316, a controller 318, and a memory 320.

The optical disc 100 is rotated by a spindle motor 310. The spindle motor 310 is controlled by a driving signal generated by a controller 318 and rotates the optical disc 100.

The pickup module 208 has a laser diode (not shown), and projects a laser beam of power required to record/reproduce/erase information using the laser diode on the recording surface of the optical disc 100 such that information is recorded/reproduced/erased on/from the optical disc 100. Moreover, the pickup module 208 includes a light receiver, such as a photodiode (not shown) to receive the laser beam 206 reflected from the recording surface of the optical disc 100 to generate an RF signal.

When recording information on the optical disc 100, recording information is encoded by an encoder 328 and is provided to a laser diode driver 314, the controller 318 provides a driving signal to the laser diode driver 314 such that the encoded information is recorded in the information recording surface of the optical disc 100, whereby recording power of the laser diode (not shown) is changed.

When reproducing information recorded in the optical disc 100, the controller 318 controls the laser diode of the pickup module 208 to generate a laser beam of power required to reproduce information such that the laser beam is projected on the information recording surface of the optical disc 100. The laser beam projected on the optical disc 100 is reflected from the surface of the information recording layer and is received by a light receiver (for example, a photodiode) of the pickup module 208. The light receiver (not shown) generates an RF signal corresponding to the quantity of the received light. An RF amplifier 304 receives and amplifies the RF signal and converts the same into a binary signal. The binary signal converted by the RF amplifier 304 is restored into digital data by a digital signal processor 306. Since the restored digital data is encoded, the restored digital data is decoded into original digital data by a decoder 308. The digital signal processor 306 estimates a beta value β, a gamma value γ, a peak value, a bottom value, and a mean value, and provides the same to the controller 318. A line speed detector 312 detects a line speed of the optical disc 100 and provides the same to the controller 318.

The RF amplifier 304 extracts a tracking error signal TE and a focus error signal FE from the received RF signal, and provides the same to the servo-controlling unit 316. In addition, the RF amplifier 304 generates a first focus servo-control signal FSC_H (a first control signal) and a second focus servo-control signal FSC_L (a second control signal) for managing a focus servo-control of the servo-controlling unit 316. The servo-controlling unit 316 generates a focus driving signal FOD based on the focus error signal FE, the first focus servo-control signal FSC_H, and the second focus servo-control signal FSC_L to perform a focus servo-control of the pickup module 208. The focus driving signal FOD is a signal for driving a focus actuator for moving the objective lens of the pickup module 208. The focus actuator controls the objective lens to be vibrated and to track the surface of the recording layers 202 and 204 on the optical disc 100 in the normal direction. Moreover, the focus driving signal FOD is a signal for mechanically moving the objective lens in the optical axis, that is, in the normal direction of the surface 212 of the optical disc. This "mechanical movement" is different from when the focus actuator tracks the surface of the recording layers 202 and 204, and fundamentally adjusts a distance between the objective lens and the optical disc 100. The servo-controlling unit 316 generates a tracking driving signal TRD based on the tracking error signal TE to perform the tracking control of the pickup module 208.

As shown in FIG. 3, the controller 318 manages overall control of the optical disc drive 302, and is connected to an external memory 320 in which information needed to control overall operation of the optical disc drive 302 and data generated during the control are stored.

Figure 4:
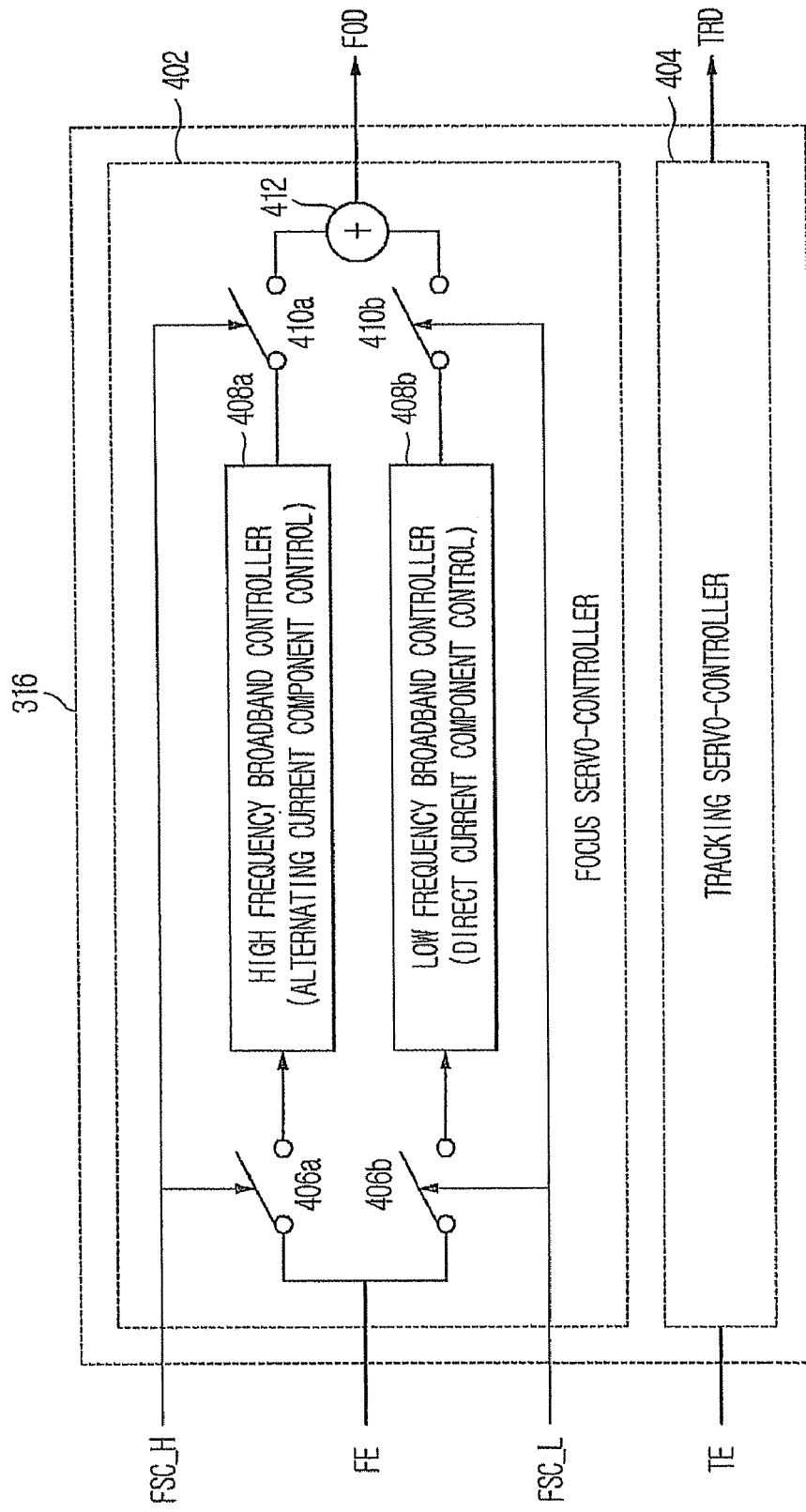
FIG. 4 is a block diagram illustrating configuration of a servo-controlling unit of the optical disc drive shown in FIG. 3.

FIG. 4 is a schematic view illustrating configuration of a servo-controlling unit of the optical disc drive shown in FIG. 3. As shown in FIG. 4, the servo-controlling unit 316 includes a focus servo-controller 402 and a tracking servo-controller 404. The focus servo-controller 402 performs the focus control of the pickup module 208 such that the laser beam projected from the pickup module 208 generates a light spot with a precise target size on the information recording surface of the optical disc 100. The tracking servo-controller 404 performs the tracking control of the pickup module 208 such that a focal point of the laser beam projected from the pickup module 208 travels along the spiral track formed at the information recording surface of the optical disc 100.

The focus servo-controller 402 includes a high frequency broadband controller 408a and a low frequency broadband controller 408b. The high frequency broadband controller 408a includes first switches 406a and 410a provided at an input side and an output side thereof. Similarly, the low frequency broadband controller 408b includes second switches 406b and 410b provided at the input side and the output side thereof. The first switches 406a and 410a control signal input and output paths of the high frequency broadband controller 408a. Similarly, the second switches 406b and 410b control signal input and output paths of the low frequency broadband controller 408b. When the first switches 406a and 410a are turned "ON", the high frequency broadband controller 408a receives and processes the focus error signal FE according to a predetermined high frequency broadband control algorithm, and outputs a high frequency broadband control signal corresponding to the processed result to an adder 412. When the second switches 406b and 410b are turned "ON", the low frequency broadband controller 408b receives and processes the focus error signal FE according to a predetermined low frequency broadband control algorithm, and outputs a low frequency broadband control signal corresponding to the processed result to the adder 412. The high frequency broadband control signal and the low frequency broadband control signal, inputted into the adder 412 are combined and outputted as the focus driving signal FOD.

The first switches 406a and 410a for controlling the signal input and output paths of the high frequency broadband controller 408a are switched by the first focus servo-control signal FSC_H. The second switches 406b and 410b for controlling the signal input and output paths of the low frequency broadband controller 408b are switched by the second focus servo-control signal FSC_L. In the example embodiment of the present invention, the first switches 406a and 410a are first turned "ON" by the first focus servo-control signal FSC_H, such that an alternating current (AC) components are firstly controlled by the high frequency broadband controller 408a. Subsequently, when a predetermined time has elapsed, the second switches 406b and 410b are turned "ON" by the second focus servo-control signal FSC_L, such that the alternating current (AC) components are controlled by the high frequency broadband controller 408a and the direct current (DC) components are controlled by the low frequency broadband controller 408b.

On the other hand, if necessary, it is possible that the second switches 406b and 410b are firstly turned "ON" by the second focus servo-control signal FSC_L, such that the direct current (DC) components are firstly controlled by the low frequency broadband controller 408b. Subsequently, when the predetermined time has elapsed, the first switches 406a and 410a are turned "ON" by the first focus servo-control signal FSC_H, such that the alternating current components are controlled by the high frequency broadband controller 408a and the direct current components are controlled by the low frequency broadband controller 408b. Moreover, if necessary, the first and second switches 406a, 410a, 406b, and 410b are simultaneously turned "ON" such that the controls of the alternating current (AC) components and the direct current (DC) components by the high frequency broadband controller 408a and the low frequency broadband controller 408b are simultaneously performed.

In the focus servo-controller 402, the high frequency broadband controller 408a manages the control of the alternating current (AC) components of the inputted focus error signal FE, that is, the high frequency broadband. Likewise, the low frequency broadband controller 408b manages the control of the direct current (DC) components of the inputted focus error signal FE, that is, the low frequency broadband. In other words, for alternating current (AC) component control, the high frequency broadband controller 408a controls the pickup module 208 as it vibrates in the normal direction of the surface of the optical disc 100 and tracks the surface of the recording layers 202 and 204 of the optical disc 100. If it is confirmed that the laser beam 206 precisely tracks the surface of the recording layers 202 and 204 of the optical disc 100 in the vertical direction of the surface by the control of the high frequency broadband controller 408a, but is still not focused at a target degree, the low frequency broadband controller 408b performs the low frequency broadband control to compensate the direct current (DC) offset components remaining in the focus error signal FE such that the distance between the objective lens and the optical disc 100 is adjusted to precisely focus the laser beam 206. These operational characteristics of the focus servo-controller 402 are shown in FIG. 5.

Figure 5:
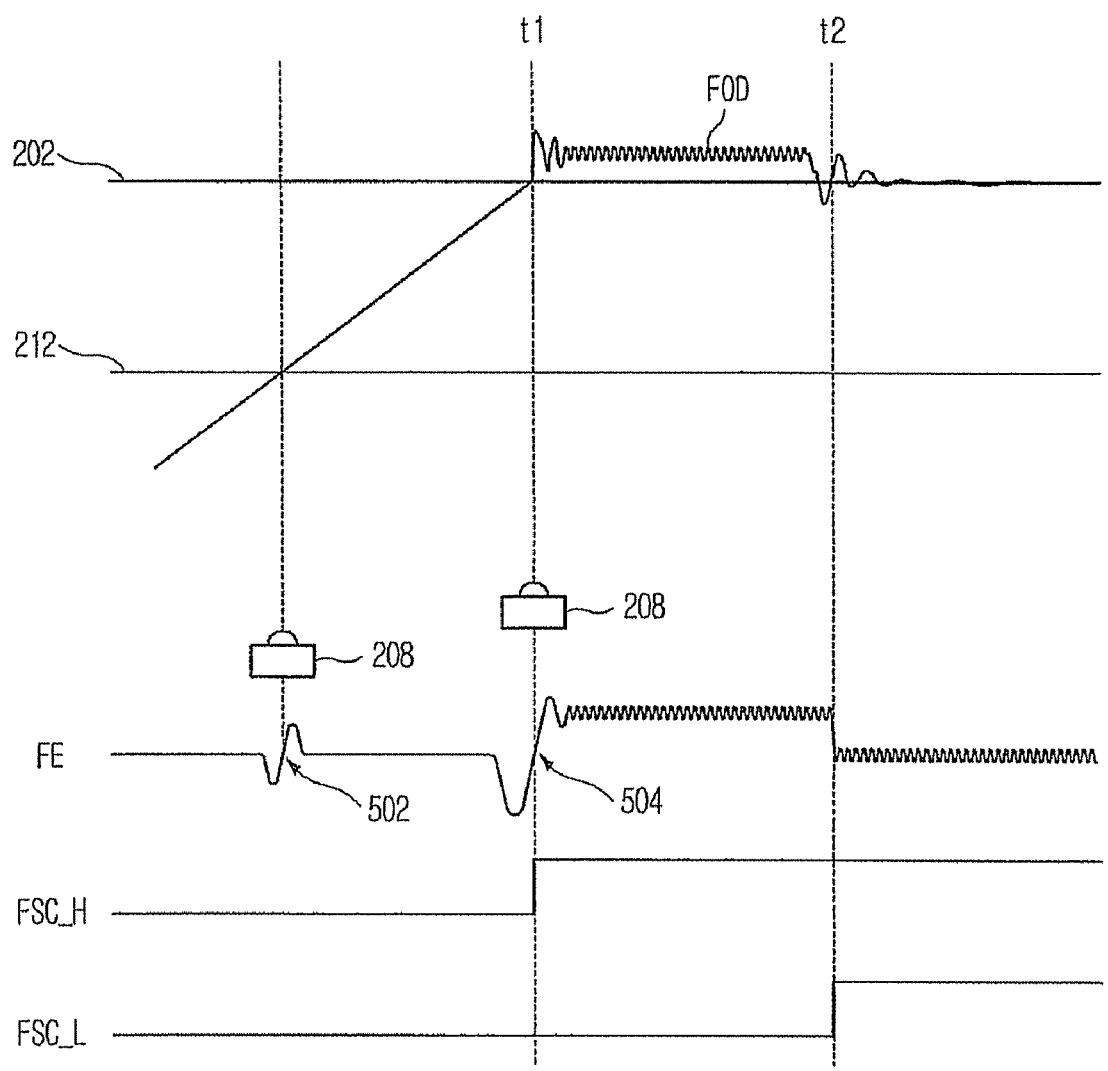
FIG. 5 is a view illustrating characteristics of a focus servo-control of a servo-controlling unit shown in FIG. 4.

FIG. 5 is a view illustrating characteristics of the focus servo-control of the servo-controlling unit shown in FIG. 4. As shown in FIG. 5, the pickup module 208 is positioned such that the focal point of the laser beam 206 is positioned lower than the disc surface 212 and is vertically moved toward the disc surface 212. During the vertical movement of the pickup module 208, S-curves 504 are detected from the focus error signal FE, whenever the focal point of the laser beam 206 approaches the disc surface 212 and the recording layer "0" 202.

In the example embodiment of the present invention, the servo-controlling unit 316 activates the first focus servo-control signal FSC_H into high level at a point t1, where a zero crossing point (ZCP) of the S-curve corresponding to a target recording layer (for example, the recording layer "0" 202) is detected such that the high frequency broadband control of the focus error signal FE is performed by the high frequency broadband controller 408a. After that, at a point where a predetermined condition is satisfied, the second focus servo-control signal FSC_L is activated into the high level such that the low frequency broadband control of the focus error signal FE is performed by the high frequency broadband controller 408a.

In other words, in the region between t1 to t2, only the high frequency broadband control is performed, and the focal point of the laser beam 206 tracks the surface of the recording layer "0" 202 of the optical disc 100 in the normal direction. In a region after t2, the high frequency broadband control and the low frequency broadband control are performed, and by doing so, the direct current (DC) offset remaining in the focus error signal FE (if remained) is compensated.

The pickup module 208 includes one or more photodiodes (not shown) for receiving (detecting) a light reflected from the recording layers 202 and 204 of the optical disc 100. The light received by the one or more photodiodes is converted into the RF signal and transmitted to the RF amplifier 304. When the focused state of the laser beam 206 projected on the optical disc 100 satisfies the target degree, sum PD_SUM of output signals of the photodiodes outputted to the RF amplifier 304 is maximum. In other words, the focused state can be determined by the magnitude of the sum PD_SUM of the output signals of the photodiodes.

In the example embodiment of the present invention, when the focused state by the high frequency broadband control satisfies a predetermined degree close to the target degree is defined as the point t2, where the low frequency broadband controller 408b starts to operate. In other words, when the sum PD_SUM of the output signals of the photodiodes are gradually increased and the magnitude thereof keeps a first predetermined value or higher value, it is determined that the pickup module 208 stably tracks the surface of a target recording layer and the low frequency broadband controller 408b is activated at the point t2 so that the direct current (DC) offset components remaining in the focus error signal FE are compensated.

Figure 6:
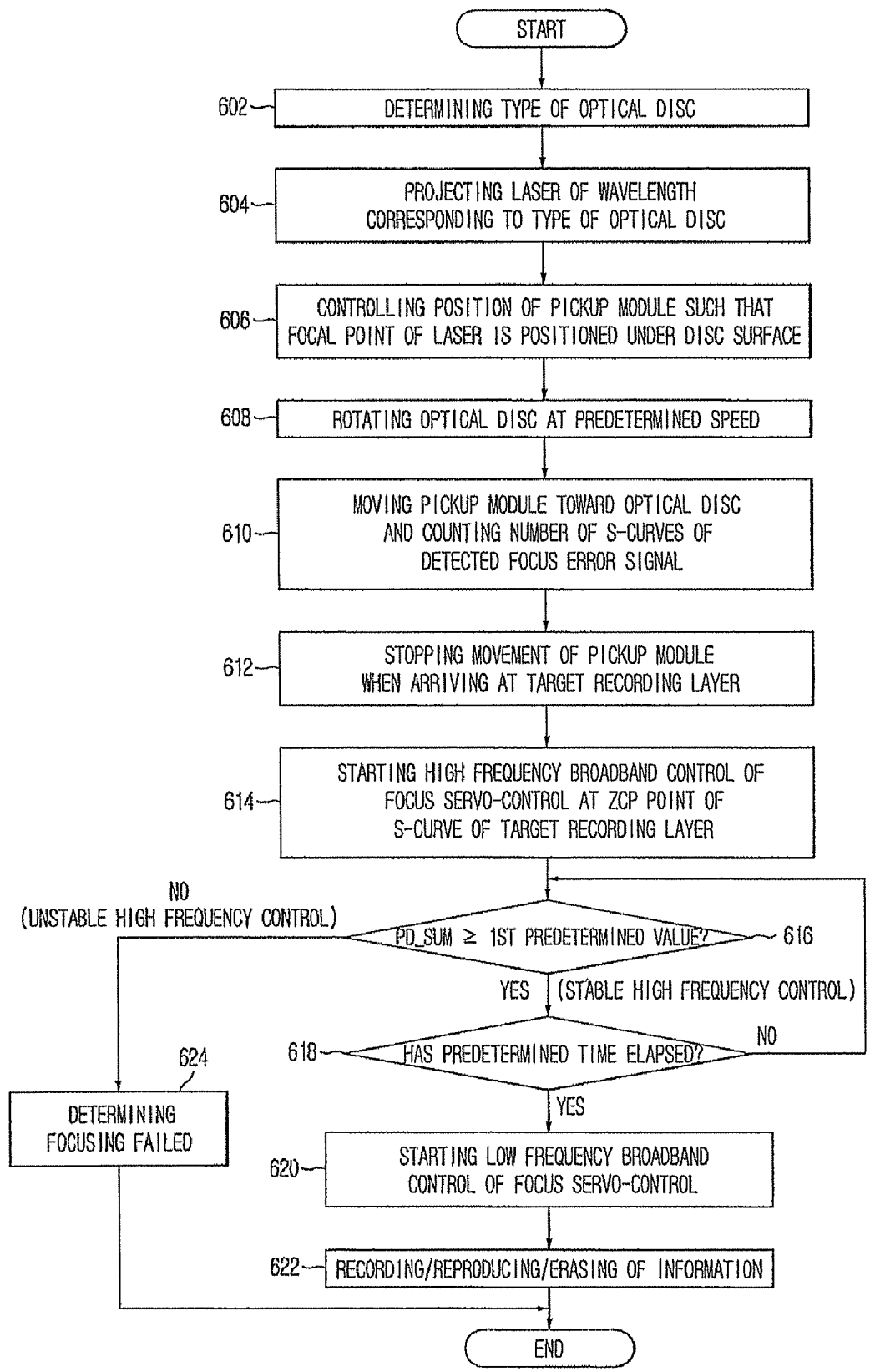
FIG. 6 is a flowchart illustrating a control method of an optical disc drive according to another example embodiment of the present invention.

FIG. 6 is a flowchart illustrating a control method of an optical disc drive according to another example embodiment of the present invention. As shown in FIG. 6, a type of an optical disc 100 loaded in a tray of an optical disc drive 302 is determined at block 602. The determination of the type of the optical disc 100 is performed to select an adequate recording/reproducing/erasing strategy corresponding to the optical disc 100. If there is an error such that the type of the optical disc 100 is not precisely determined, since an adequate recording/reproducing/erasing strategy cannot be selected, the precise recording/reproducing/erasing of information may be not performed. When the type of the optical disc 100 is determined, a laser beam 206 of a wavelength corresponding to the determined optical disc 100 is projected on the surface of the optical disc 100 at block 604. At that time, the position of the pickup module 208 is controlled such that the focal point of the laser 206 is located under the disc surface 212 at block 606. At the state of projecting the laser beam 206 such that the focal point of the laser beam 206 is located under the disc surface 212, the optical disc 100 is rotated at a predetermined speed such that defects or unevenness of the recording layers 202 and 204 are settled at block 608.

When the preparing process of focusing the laser beam 206 on the target recording layers 202 and 204 of the optical disc 100 is finished, the S-curves appeared in the focus error signal FE are detected and the number of the S-curves is counted during the movement of the pickup module 208 toward the optical disc 100 and whether the surface on which the laser beam 206 is focused now is the surface of the target recording layers 202 and 204 is determined at block 610. When the focal point reaches the target recording layers 202 and 204, the movement of the pickup module 208 is stopped at block 612.

In this example embodiment of the present invention, in order to continuously maintain the focused state and the tracked state of the laser beam 206, the high frequency broadband control among the high frequency broadband control and the low frequency broadband control of the focus servo-control is performed, and when the result of the high frequency broadband control is stable, the low frequency broadband control is further performed as needed. In other words, the first switches 406a and 410a, as shown in FIG. 4, are turned "ON" at the point ZCP of the S-curve corresponding to the target recording layers 202 and 204 to start to perform the high frequency broadband control by the high frequency broadband controller 408a at block 614. During the performance of the high frequency broadband control, whether the sum PD_SUM of the output signals from the photodiodes (not shown) included in the pickup module 208 is increased over a first predetermined value is monitored at block 616. When the sum PD_SUM of the output signals from the photodiodes (not shown) included in the pickup module 208 is greater than the first predetermined value, the high frequency broadband control is determined stable, and the objective lens of the pickup module 208 is precisely tracking the surface of the recording layers 202 and 204 of the optical disc 100 in the normal direction. Conversely, when an error such as a failure of determination of the type of the optical disc 100 occurs, the high frequency broadband control is unstable due to the selection of inadequate recording/reproducing/erasing strategy so that the objective lens of the pickup module 208 cannot precisely track the surface of the recording layers 202 and 204 of the optical disc 100 in the normal direction. As such, when the sum PD_SUM of the output signals from the photodiodes (not shown) included in the pickup module 208 does not reach the first predetermined value ('NO' at block 616, shown in FIG. 6), the focusing failure is determined and the servo-control is finished at block 624.

During the performance of the high frequency broadband control, when the sum PD_SUM of the output signals from the photodiodes (not shown) is greater than the first predetermined value ('YES' at block 616, shown in FIG. 6), whether this state is maintained for a predetermined time period is monitored at block 618. Here, the first predetermined value is a reference value when the high frequency broadband control of the focus servo-control is stable. Thus, when the sum PD_SUM of the output signals from the photodiodes (not shown) greater than the first predetermined value is maintained for a predetermined time period, the high frequency broadband control is determined as not temporarily stable but continuously stable, and the low frequency broadband control of the focus servo-control is started so that both the high frequency broadband control and the low frequency broadband control are performed at block 620. In order to start the low frequency broadband control of the focus servo-control, the second switches 406b and 410b, as shown in FIG. 4, are turned "ON" to activate the low frequency broadband controller 408b. During the performance of both of the stable high frequency broadband control by the high frequency broadband controller 408a and the low frequency broadband control by the low frequency broadband controller 408b (that is, the offset compensation control of the direct current "DC" components), the target information is recorded/reproduced/erased at block 622.

Figure 7A:
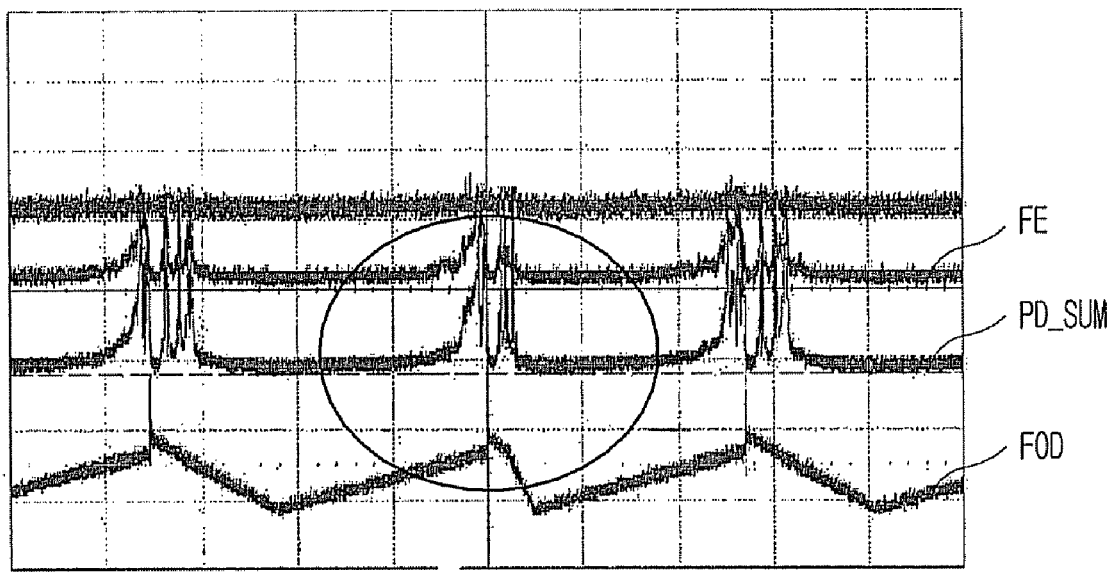
FIG. 7 is a view illustrating a focus driving signal in which a direct current offset is compensated by performing a high frequency broadband control prior to a low frequency broadband control in the focus servo-control in the present invention.
Figure 7B:
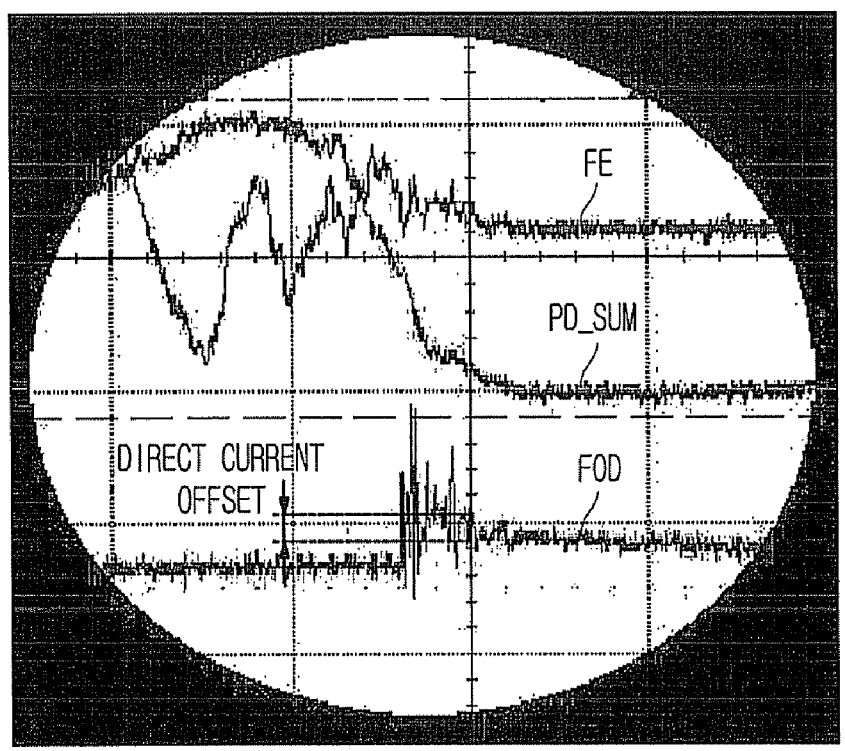

FIGS. 7A-7B illustrate a focus driving signal FOD in which the direct current (DC) offset is compensated by performing the high frequency broadband control prior to the low frequency broadband control in the focus servo-control according to an example embodiment of the present invention. As shown in FIG. 7A, if the high frequency broadband control is performed prior to performing the low frequency broadband control in the focus servo-control, since the low frequency broadband control can be performed to compensate the direct current (DC) offset at the state of confirming the stability of the focus servo-control, the compensation of the direct current (DC) offset of the focus error signal FE can be stably performed. FIG. 7B is an enlarged view of an oval portion of FIG. 7A. As shown in FIG. 7B, the direct current (DC) offset of the focus driving signal FOD is very small by compensating the direct current (DC) offset of the focus error signal FE.

Figure 8A:
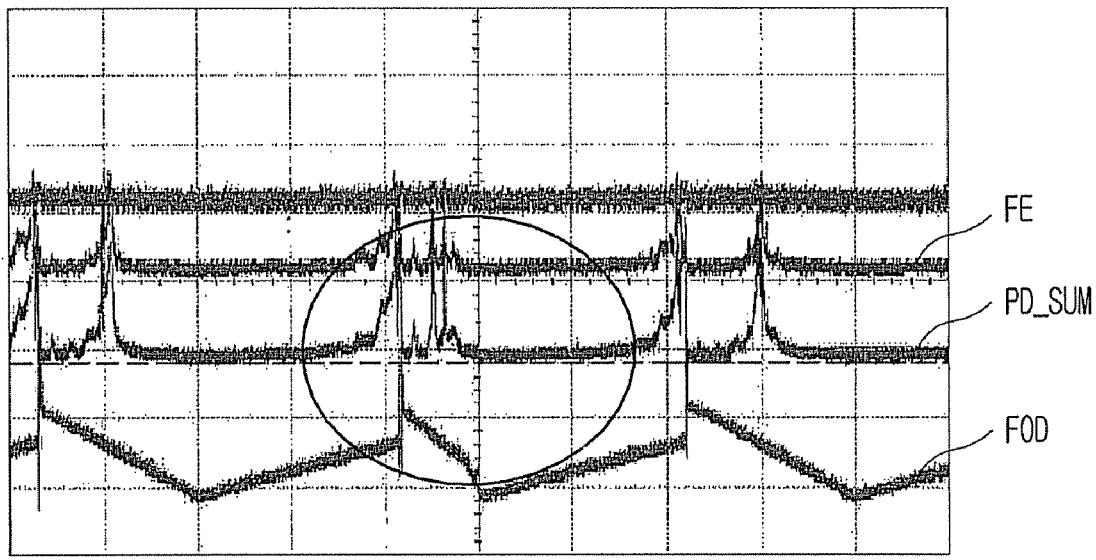
FIG. 8 is a view illustrating a focus driving signal when the high frequency broadband control and the low frequency broadband control are simultaneously performed in the focus servo-control.
Figure 8B:
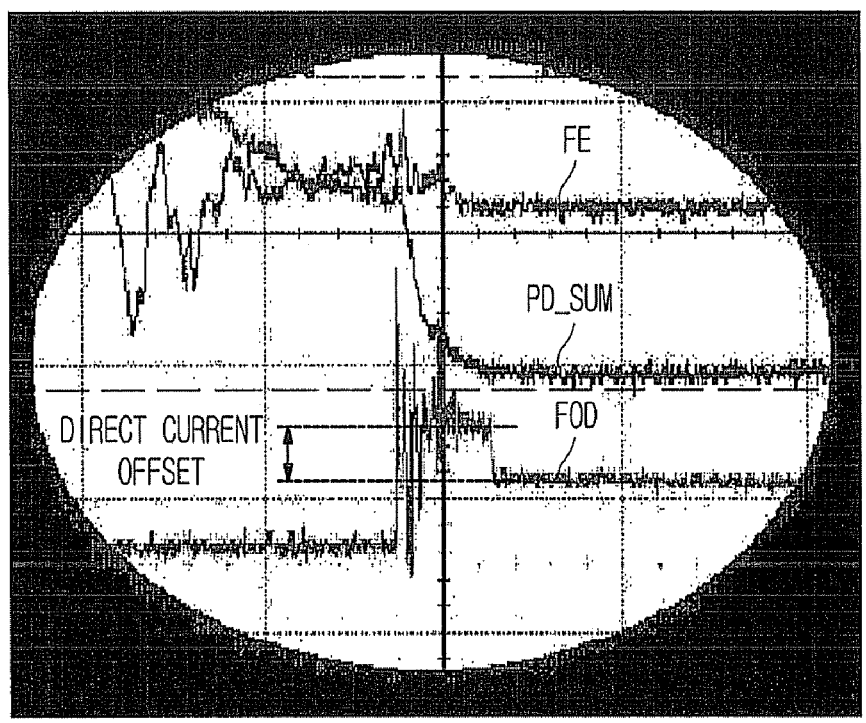

The reduction of the direct current (DC) offset in the example embodiment of the present invention is more apparent than a case of a control method as shown in FIGS. 8A-8B. FIGS. 8A-8B illustrates a focus driving signal FOD when the high frequency broadband control and the low frequency broadband control are simultaneously performed in the focus servo-control. As shown in FIG. 8A, in the focus servo-control, if the high frequency broadband control and the low frequency broadband control are simultaneously started when the focus error signal FE is abnormal due to an error of the determination of the type of the optical disc 100, the traveling distance of the objective lens included in the pickup module 208 is increased due to the low frequency broadband control with high response characteristics so that the possibility of collision of the objective lens against the surface 212 of the optical disc 100 is increased. FIG. 8B is an enlarged view of an oval portion of FIG. 8A. When comparing FIG. 7B with FIG. 8B, since the amplitude of the focus driving signal FOD in FIG. 7B is much smaller than that in FIG. 8B, it can be noted that the possibility of the collision is very low, even when the objective lens included in the pickup module 208 closely approaches the surface of the optical disc 100.

According to the optical disc drive and the control method thereof in accordance with example embodiments of the present invention, the servo-control of the pickup module is prevented from being unstable due to the abnormal control signal, when recording/reproducing/erasing information to/from the optical disc in the optical disc drive.

Particularly, when the recording/reproducing/erasing of the information in the high density optical disc, since the physical collision between the pickup module and the optical disc is prevented by the stable servo-control of the pickup module, even when the objective lens of the pickup module approaches very closely to the surface of the optical disc, the upper limit of the recording density of the optical discs supported by the optical disc drive is significantly extended so that more variety of types of optical discs can be supported.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, components of an optical disc drive, as shown in FIG. 3, can be arranged differently as long as a focus servo control is implemented according to the principles of the present invention. In addition, other laser sources may be used in lieu of one or more laser diodes (LDs) to emit laser beams. Both high frequency broadband control and low frequency broadband control algorithms can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs), flash memories; and other media. Instructions of the software routines or modules may also be loaded or transported, via wireless networks. Similarly, many components, including the digital signal processor 306, the decoder 308, the line speed detector 312, the laser diode driver 314, and the servo-controlling unit 316 can be incorporated into a single system controller. Moreover, such a system controller can be implemented as a chipset having firmware, or alternatively, a general or special purposed computer programmed to implement methods as described with reference to FIG. 6. Accordingly, it is intended, therefore, that the present invention not be limited to the various example embodiments disclosed, but that the present invention includes all embodiments falling within the scope of the appended claims.

What is claimed is:

1. An optical disc drive, comprising:
   a pickup module comprising an objective lens to focus a laser beam on a surface of a recording layer of an optical disc; and
   a focus servo-controller to provide a focus driving signal to control a position of the objective lens in the pickup module, the focus servo-controller including a high frequency broadband controller to provide a focus driving component signal from a focus error signal, a low frequency broadband controller to provide another focus driving component signal from the focus error signal, where the focus driving component signal from the high frequency broadband controller is the focus driving signal prior to a compensation thereof by the other focus driving component signal from the low frequency broadband controller.

2. The optical disc drive according to claim 1, further comprising:
   an RF amplifier to receive a RF signal from the pickup module and to generate the focus error signal, a first control signal from the RF signal by which the focus driving component signal is the focus driving signal, and a second control signal from the RF signal by which the other focus driving signal compensates the focus driving signal, wherein
   the focus servo-controller generates the focus driving signal from the focus error signal, the first control signal, and the second control signal.

3. The optical disc drive according to claim 1, wherein the focus servo-controller further comprises an adder to combine the focus driving component signal from the high frequency broadband controller and the other focus driving component signal from the low frequency broadband controller to compensate the focus driving signal.

4. The optical disc drive according to claim 1, wherein the focus servo-controller further comprises:
   a first switch for controlling a signal path of the focus error signal into the high frequency broadband controller and the focus driving component signal therefrom; and
   a second switch operable independently of the first switch for controlling the signal path of the focus error signal into the low frequency broadband controller and the other focus driving component signal therefrom,
   wherein the first switch is switched by the first control signal and the second switch is switched by the second control signal.

5. A control method of an optical disc drive including a pickup module having an objective lens for focusing a laser beam on a surface of a recording layer of an optical disc, the control method comprising:

receiving a high frequency focus error signal indicative of whether the pickup module is focused on the surface of the recording layer of the optical disc;

generating a focus driving signal to position the objective lens in accordance with the focus error signal;

compensating a signal level of the focus driving signal for a low frequency offset therein in accordance with a direct current (DC) offset in the focus error signal.

6. An optical disc drive comprising:

a pickup module including an objective lens to focus a laser beam on a surface of a recording layer of an optical disc; and a servo-control unit arranged to generate a focus driving signal to drive the objective lens included in the pickup module to focus the laser beam on a target track of the optical disc, based on a focus error signal obtained from a signal corresponding to a quantity of the laser beam reflected from the surface of the optical disc, wherein a high frequency broadband control and a low frequency broadband control of the focus error signal are performed such that the objective lens can track the surface of the recording layer of the optical disc and travel in an optical axis of the laser beam and wherein the high frequency broadband control is performed prior to the low frequency broadband control.

7. The optical disc drive according to claim 6, further comprising:

an RF amplifier to receive the quantity of the laser beam reflected from the surface of the recording layer from the pickup module and to generate the focus error signal in accordance therewith.

8. The optical disc drive according to claim 7, wherein the servo-control unit comprises:

a focus servo-controller to perform a focus servo-control of the pickup module; and a tracking servo-controller to perform a tracking servo-control of the pickup module.

9. The optical disc drive according to claim 8, wherein the focus servo-controller comprises:

a high frequency broadband controller to control the focus driving signal in accordance with the high frequency signal components of the focus error signal to generate a high frequency broadband control signal;

a low frequency broadband controller to control the focus driving signal in accordance with the low frequency signal components of the focus error signal to generate a low frequency broadband control signal; and an adder to combine the high frequency broadband control signal and the low frequency broadband control signal and to output added signals as the focus driving signal.

10. The optical disc drive according to claim 9, wherein the focus servo-controller further comprises:

a first switch for controlling a signal path into and out of the high frequency broadband controller in accordance with a first control signal generated by the RF amplifier; and a second switch for controlling a signal path into and out of the low frequency broadband controller in accordance with a second control signal generated by the RF amplifier.

11. An optical disc drive comprising:

a pickup module including an objective lens to focus a laser beam on a surface of a recording layer of an optical disc; and a control unit arranged to perform a focus servo-control of the pickup module using a high frequency broadband control and a low frequency broadband control of a focus error signal obtained from a signal corresponding to a quantity of the laser beam reflected from the surface of the optical disc, wherein the high frequency broadband control is performed prior to the low frequency broadband control.

12. The optical disc drive according to claim 11, wherein the high frequency broadband control determines from alternating current (AC) components of the focus error signal whether the objective lens is tracking the surface of the recording layer to within a predetermined value, and the low frequency broadband control compensates the focus driving signal in accordance with a direct current (DC) offset of the focus error signal.

13. The optical disc drive according to claim 11, further comprising:

an RF amplifier to receive the signal corresponding to a quantity of the laser beam reflected from the surface of the recording layer from the pickup module and to generate the focus error signal.

14. The optical disc drive according to claim 13, wherein the control unit comprises:

a focus servo-controller to perform a focus servo-control of the pickup module; and a tracking servo-controller to perform a tracking servo-control of the pickup module.

15. The optical disc drive according to claim 13, wherein the focus servo-controller comprises:

a high frequency broadband controller to generate a high frequency broadband control signal in accordance with the alternating current (AC) components of the focus error signal;

a low frequency broadband controller to generate a low frequency broadband control signal in accordance with the direct current (DC) components of the focus error signal; and an adder to combine the high frequency broadband control signal and the low frequency broadband control signal and to output added signals as the focus driving signal.

16. The optical disc drive according to claim 13, wherein the focus servo-controller further comprises:

a first switch for controlling a signal path into and out of the high frequency broadband controller in accordance with a first signal generated by the RF amplifier; and a second switch for controlling a signal path into and out of the low frequency broadband controller in accordance with a second control signal generated by the RF amplifier.

17. An optical disc drive, comprising:

a pickup module comprising an objective lens to focus light on target layer of an optical disc in accordance with a focus driving signal and at least one photodetector to generate an electrical signal proportionate to the light reflected from each of the layers of the optical disc;

an amplifier electrically coupled to the photodetector to receive the electrical signal, to generate therefrom a focus error signal indicative of an error in a position of the objective lens, and to generate therefrom a plurality of independent focus control signals; and a servo-controlling unit electrically coupled to the amplifier to generate the focus driving signal such that a signal level of the focus error signal is bound to within a target degree of error, the servo-controlling unit operable into a plurality of states in accordance with signal levels of the focus control signals in which the servo-controlling unit, while in a first of the states, provides the focus driving signal in accordance with the level of the focus error signal and, while in a second of the states, compensates the focus driving signal for an offset in the level of the focus error signal that precludes the focus error signal from being bound to within the target degree of error.

18. The optical disc drive of claim 17, wherein the servo-controlling unit includes:
a high frequency broadband controller to generate the focus driving signal while the servo-controlling unit is in the first state;
a low frequency broadband controller to generate an offset signal corresponding to the offset in the signal level of the focus error signal while the servo-controlling unit is in the second state; and
an adder selectively coupled to the high frequency broadband controller and the low frequency broadband controller to combine the focus driving signal generated by the high frequency broadband controller and the offset signal level generated by the low frequency broadband controller while the servo-controlling unit is in the second state.

19. The optical disc drive of claim 18, wherein the servo-controlling unit includes:
a switch unit electrically interposed between the adder and both of the high frequency broadband controller and the low frequency broadband controller, the switch unit providing a signal path into and out of the high frequency broadband controller while the servo-controlling unit is in the first state and independently providing a signal path into and out of the low frequency broadband controller while the servo-controlling unit is in the second state.

20. The optical disc drive of claim 19, wherein the amplifier determines whether the signal level of the focus error signal exceeds the target degree of error over a predetermined time interval while providing a first of the focus control signals the switch unit and provides a second of the focus control signals to the switch unit independently of the generation of the first control signal upon a positive determination that the signal level of the focus error signal exceeds the target degree of error subsequent to the lapsing of the time interval.

21. A method for focusing an objective lens onto an optical disc in an optical disc drive, the method comprising:
receiving an electrical signal proportionate to light reflected from a target layer of the optical disc;
generating a focus driving signal proportionate to a signal level of a focus error signal determined from the received electrical signal;
positioning the objective lens relative to the optical disc in accordance with the focus driving signal;
determining after a predetermined time interval whether the signal level of the focus error signal is bound to within a target degree of error;
compensating the focus driving signal for an offset in the signal level of the focus error signal such that the focus error signal is bound to within the target degree of error subsequent to the lapsing of the time interval; and
positioning the objective lens relative to the optical disc in accordance with the compensated focus driving signal.

22. The method of claim 21, wherein the compensating of the focus driving signal includes:
extracting a low frequency signal component from the focus error signal;
determining the offset in the signal level of the focus error signal from the extracted low frequency signal component thereof;
generating an offset compensation signal corresponding to the determined offset in the signal level of the focus error signal; and
combining the offset compensation signal and the focus driving signal to produce the compensated focus driving signal.

* * * * *